J. CARR.
Thill-Coupling.

No. 208,671.  Patented Oct. 8, 1878.

Section through X.Y.

Section through P.Q.

WITNESSES:
S. C. Amberson
Wm. W. Redfield

John Carr, INVENTOR
Wm. W. Redfield, ATTORNEY

N. PETERS, PHOTO-LITHOGRAPHER, WASHINGTON, D. C.

UNITED STATES PATENT OFFICE.

JOHN CARR, OF MINNEAPOLIS, MINNESOTA.

IMPROVEMENT IN THILL-COUPLINGS.

Specification forming part of Letters Patent No. 208,671, dated October 8, 1878; application filed August 2, 1878.

*To all whom it may concern:*

Be it known that I, JOHN CARR, of the city of Minneapolis, in the county of Hennepin and State of Minnesota, have invented certain new and useful Improvements in Thill-Couplings; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1:
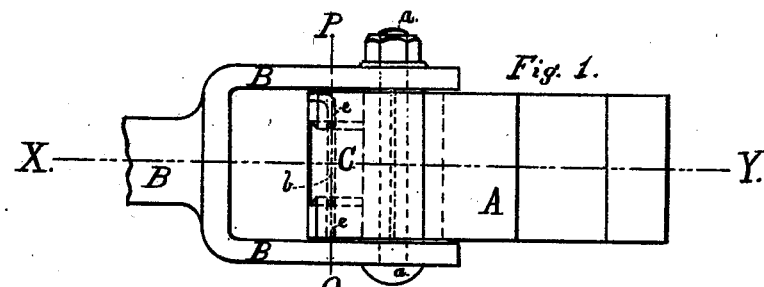
Figure 2:
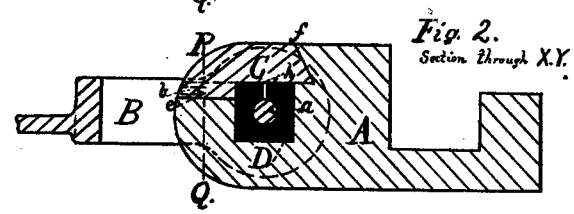
Figure 3:
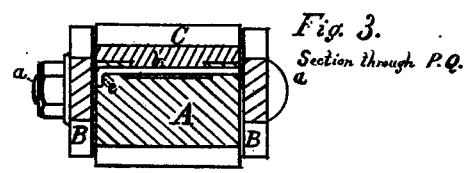

Figure 1 is a plan; Fig. 2, a vertical section through the line X Y; Fig. 3, a vertical section through the line P Q, and Fig. 4 a perspective view.

A is the shackle or portion of the coupling permanently attached to the axle of the vehicle. B is the end of the thill, forked into two lugs or branches, as shown in the drawing. These forks extend over the sides of A. A bolt, $a$, passes through these forks, and holds between them the prism of rubber D, with its slot or kerf $h$. The bolt $a$ also passes through the rubber D. This rubber D lets into a slot of the same shape in A, as shown in Fig. 2, and by means of its kerf $h$ accommodates itself to the rigidity of fit by which the said rubber D may enter A, and this same rigidity of fit also insures a close clasping of D around the bolt $a$. This bolt or pin $a$, by means of the nut on either end of the same, can also cause the two forks of B to keep in close contact with A, thus effectually preventing any lateral motion that might arise from wear.

Figure 4:
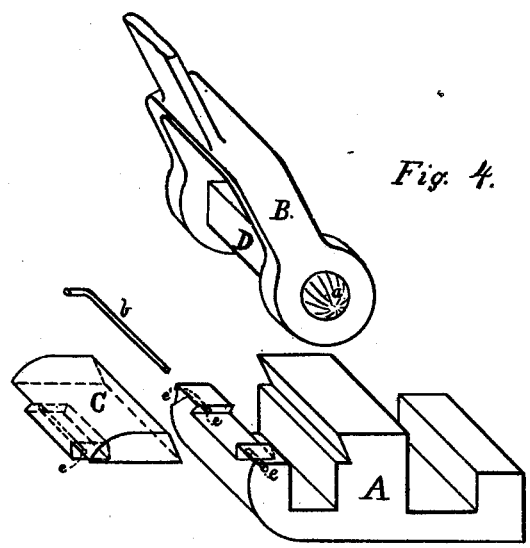

Now, to keep the rubber D down into its place, a piece, C, is provided, (shown in place in Figs. 1, 2, and 3, and withdrawn in Fig. 4.) This, by means of a dovetailed rib beneath, slides onto A over D, and securely locks D down into its place.

The end $f$ of C is inclined, so as to go under a corresponding inclination in A, thus firmly holding down that end of C. The dovetailed rib beneath the other end of C, of course, effectually holds that down. Now, to make sure that C stays into its place after sliding the same therein, a pin, $b$, is provided, with one end bent, as shown in Fig. 4. This pin $b$ slips into a hole, $e$, through A and C, as shown in the drawing. The curved end of $b$ lets into a groove, $e'$, prepared for it on the side of A, as shown clearly in Fig. 4. Now, when the two forks of B assume a horizontal or such position as they would naturally have when the vehicle is in use, it is plain that in such position the pin $b$ cannot possibly come out or be removed.

The operation of attaching the thills to and detaching the thills from the vehicle may be briefly described, as follows:

First. To attach the thills to the vehicle, keeping the side of D, containing the kerf $h$, uppermost, place D in its slot in A, pushing it well down. Then raise the thills vertically, or nearly so—that is, far enough to allow $b$ to enter $e$. Then slide C into A as far as it will go. Then slide $b$ into $e$, placing the curved end of $b$ in the groove $e'$, same as A. Then lower thills to natural position, and the vehicle is ready for use.

Second. To detach the thills from the vehicle, raise the thills enough to admit of $b$ being pulled from $e$. Then slide out C. (All shown in Fig. 4.) Then nothing remains but to pull D out from A, and the separation of B from A is complete. C and $b$ may then be replaced to insure against loss.

It is here remarked that D once being fastened to B by means of the bolt $a$, can remain so fastened, whether the thills be attached to the vehicle or not; and, moreover, after the nut on the bolt $a$ is once in place, the end outside said nut is upset or riveted over in order to prevent the same from ever coming off.

The advantages of this thill-coupling are, that it has no springs to get out of order or to weaken by wear; it renders possible the attaching and detaching in an instant of time; it is cheap to construct, and has rigidity and flexibility in desirable proportions; and, finally, it is safe, there being no possible danger of an accidental detachment.

What I claim as my invention is—

1. The combination of the shackle A, the thill-iron B, the rubber D, the bolt $a$, the piece C, and the pin $b$, substantially as and for the purpose hereinbefore set forth.

2. The shackle A, having one end dove tailed to receive C, and having also the hole e and groove c' to receive the pin b, substantially as described.

3. The sliding piece C, with its dovetailed bottom and end, and hole e for pin b, substantially as described.

4. The combination of the shackle A, the sliding piece C, and the pin b, substantially as described.

In testimony that I claim the foregoing as my own I do affix my signature in presence of two witnesses.

JOHN CARR.

Witnesses:
W. S. M. ABBOTT,
WM. W. REDFIELD.